United States Patent [19]

Harmand

[11] 4,365,917

[45] Dec. 28, 1982

[54] WORK-HOLDING DEVICE

[76] Inventor: Pierre Harmand, 9 Rue Malaz, F-74600 Seynod, France

[21] Appl. No.: 214,001

[22] PCT Filed: Dec. 13, 1979

[86] PCT No.: PCT/FR79/00124

§ 371 Date: Sep. 8, 1980

§ 102(e) Date: Sep. 8, 1980

[87] PCT Pub. No.: WO80/01365

PCT Pub. Date: Jul. 10, 1980

[30] Foreign Application Priority Data

Jan. 8, 1979 [FR] France .................. 79 00310

[51] Int. Cl.³ .............................................. B23C 3/05
[52] U.S. Cl. .............................. 409/201; 408/115 R; 408/709; 409/216
[58] Field of Search ................. 409/201, 178, 216; 408/72, 115, 75, 97, 708, 709; 308/3 A, DIG. 1, 70

[56] References Cited

U.S. PATENT DOCUMENTS 2,065,173 12/1936 Dars ................................. 308/70 X
2,823,591  2/1958 Craddock et al. ............. 409/201 X
3,764,204 10/1973 Kammeraad .................... 408/75
4,099,801  7/1978 Korrenn et al. ............. 308/DIG. 1

FOREIGN PATENT DOCUMENTS 834316  3/1952 Fed. Rep. of Germany ...... 408/708
1049192  1/1959 Fed. Rep. of Germany ...... 408/708
1256998 12/1967 Fed. Rep. of Germany ...... 409/201
2717907 10/1978 Fed. Rep. of Germany ........ 408/97
 562738 11/1923 France ............................... 409/216
 926072  5/1963 United Kingdom ............... 408/708

*Primary Examiner*—William R. Briggs
*Attorney, Agent, or Firm*—Spencer & Kaye

[57] ABSTRACT

An adjustable guide for a tool holder for use in high precision machining which includes a housing, a guide seat located within the housing and a guide element movable with respect to the housing. A casing is disposed in the housing and positioned between the guide seat and guide element, the casing having a center portion and first and second end portions shaped to mate with internal surfaces of the guide seat and guide element respectively. Actuating means is provided for engaging the internal surface of the guide element with the second end portion of the casing. Fluid is delivered to the housing to support the casing when the internal surface of the guide element is out of engagement with the second end portion of the casing to permit displacement of the casing to a predetermined position.

6 Claims, 3 Drawing Figures

WORK-HOLDING DEVICE

FIELD OF THE INVENTION

The present invention relates to a shaft or rod guide for a tool holder, for example for a drilling or boring machine or an adjusting device, which enables working pieces to be machined with precision, in particular a shaft or rod for a tool holder for cleaning valve seats.

DESCRIPTION OF THE PRIOR ART

Conventional rods or shaft guides comprise either a fixed casing or an oscillating casing locked by mechanical means, such as the rod disclosed in French Pat. No. 562 738 filed by MONPAIN on 27th of February 1923. Such means have the disadvantage that positioning has to be carried out by trial and error which is not precise enough.

British Pat. No. 926 072 discloses a rod which oscillates by means of a spherical head capable of moving between a fixed seat and a movable seat supported by a piston acted upon by a hydraulic fluid. In this device the sole purpose of the fluid is to stop the spherical head between the two seats.

In short, these devices are operated manually and must overcome the inertia of the rod assembly. In devices of the kind described above, the rod, its casing and its means for transmission and control can attain weights of 140 kg which renders precise manual positioning impossible on account of friction.

The object of the present invention is to substantially eliminate excessive friction so as to position the rod with very great precision irrespective of the plane in which the assembly is located, and at a pressure of at least 1 g/cm$^2$.

SUMMARY OF THE INVENTION

To achieve the object of the invention there is provided an adjustable shaft or rod guide having a casing comprising a spherical shell disposed between a movable seat and a fixed seat, the shell being alternately immobilised by pressure on the movable seat which is subjected to a gaseous fluid circuit, or is relieved of this pressure by reversal of the circuit and raised by a further gaseous fluid circuit. The shell is disposed on a cushion of gas and is enveloped thereby. The gas can escape through escape channels between the shell and the seat. In this manner the rod does not have any inertia and can assume any desired angular position.

BRIEF DESCRIPTION OF THE DRAWINGS

Other details and advantages of the invention will be apparent from the description and the claims which follow, and from the drawings in which

DESCRIPTION OF THE PREFERRED EMBODIMENT

Figure 1:
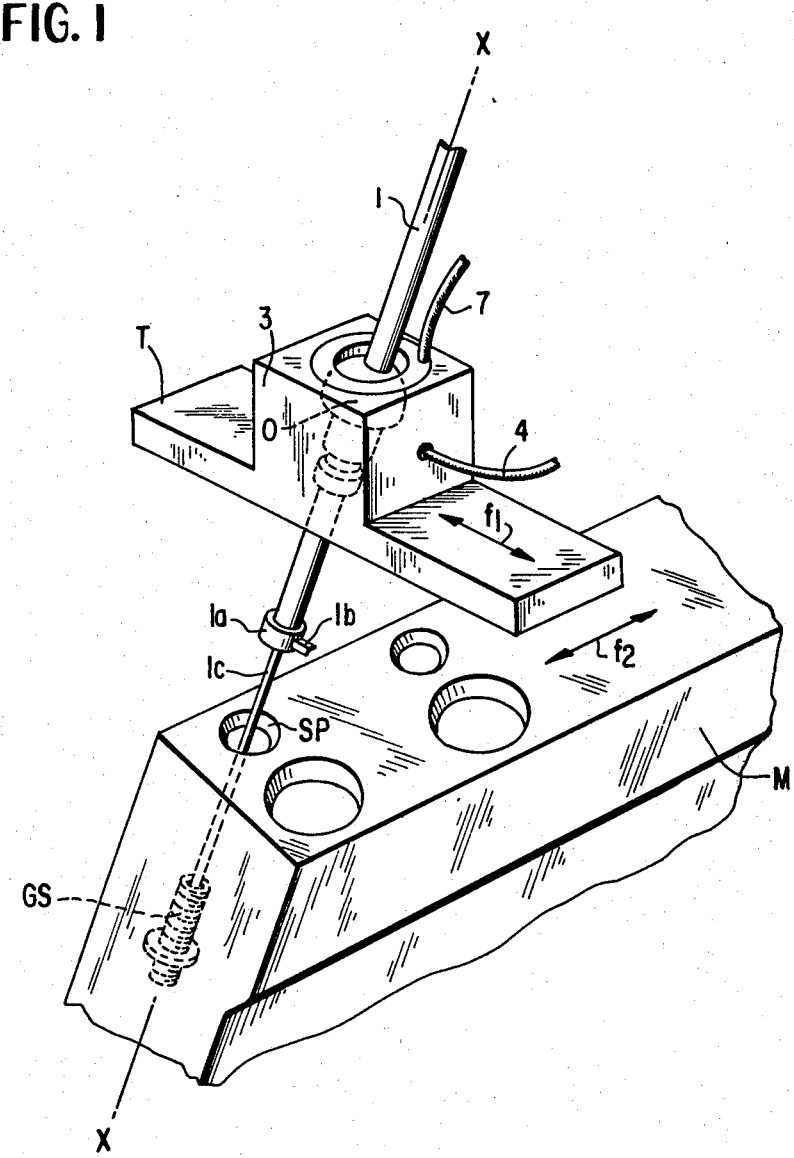
FIG. 1 is a schematic representation of an adjustable rod guide in accordance with the invention set up for a device for cleaning valve seats.

In FIG. 1 a rod 1 is provided with a holder 1a having attached thereto a tool 1b which is capable of assuming any convenient position for a guide stem 1c. The stem is an extension of the tool and can be introduced into a guide GS of a valve of a motor M having a valve seat SP to be cleaned. In a classical manner the support head for the rod (here housing 3) is subjected to alternate displacements in a horizontal plane according to arrows f1 and f2. A table T is integral with the housing 3.

The displacements may be mechanical, hydraulic or pneumatic and serve the purpose of moving the centre 0 of the rod so as to align its axis X—X with the extension of the axis of the guide GS of the valve stem of the motor M of which the seat SP has to be cleaned.

Figure 2:
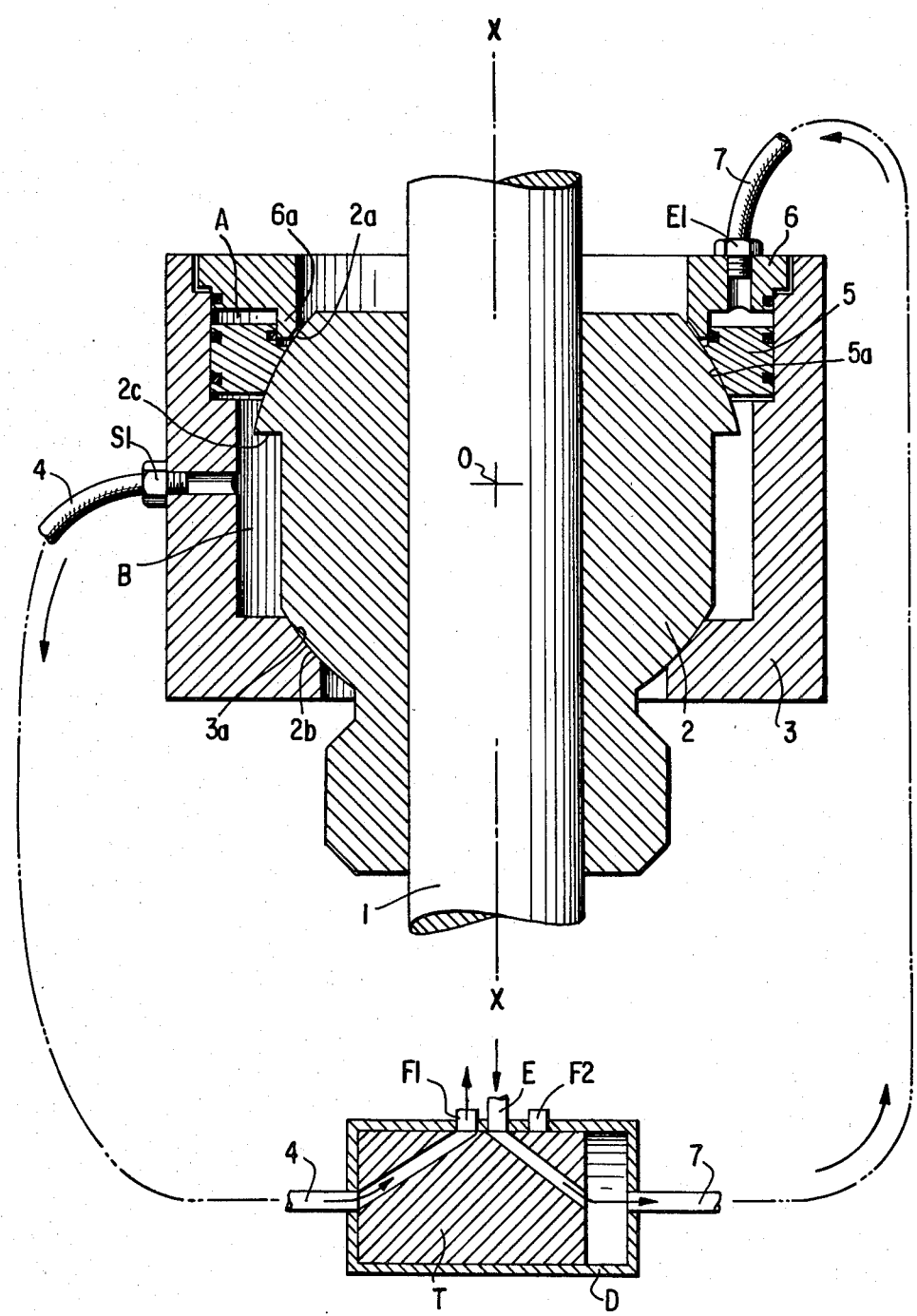
FIG. 2 is a section of an adjustable rod guide in accordance with the invention in an immobilised position.

Referring to FIG. 2, the rod 1 slides and travels in a casing 2 which comprises a shell having two spherical portions 2a and 2b. The shell is enclosed in the housing 3 which is subjected to displacements of the table T according to the arrows f1 and f2. The housing 3 accommodates a cylinder having a piston 5. The lower section of the housing 3 comprises a concave portion having sufficient sphericity so as to constitute a fixed seat 3a for resting thereon a lower spherical portion 2b of the shell of the casing 2. Furthermore, a guide element, piston 5 itself also comprises a concave portion of sufficient sphericity to rest against the upper spherical portion of the shell of the casing 2 and which acts as a movable seat. The cylinder is completed by an extremity 6 provided with a projection 6a which is directed towards the inside of the cylinder and which serves as an abutment for limiting the displacement of the piston upwardly. The extremity 6 is provided with a pipe line 7.

Inside the housing 3 there are two chambers, i.e. one upper chamber A between the piston 5 and the extremity 6 and one lower chamber B between the piston 5 and the seat 3a. The chamber B communicates with a pipe line 4. The shell of the casing 2 comprises a projection 2c being disposed at a level lower than that of the piston 5.

When air is admitted through the pipe line 7, the piston 5 is pushed downwardly. The movable seat of the piston 5 is pushed vigorously against the upper spherical portion 2a of the shell of the casing 2 and subsequently locks the shell in its seat.

To alter the angular position of the casing 2 it is necessary to relieve the shell from the coersion exerted by the movable seat of the piston 5. To this end the pipe line 7 is connected to the open air. The air under pressure is introduced into the pipe line 4 and pushes the piston 5 upwardly up to the abutment 6a and raises the shell by acting on the projection 2c.

Figure 3:
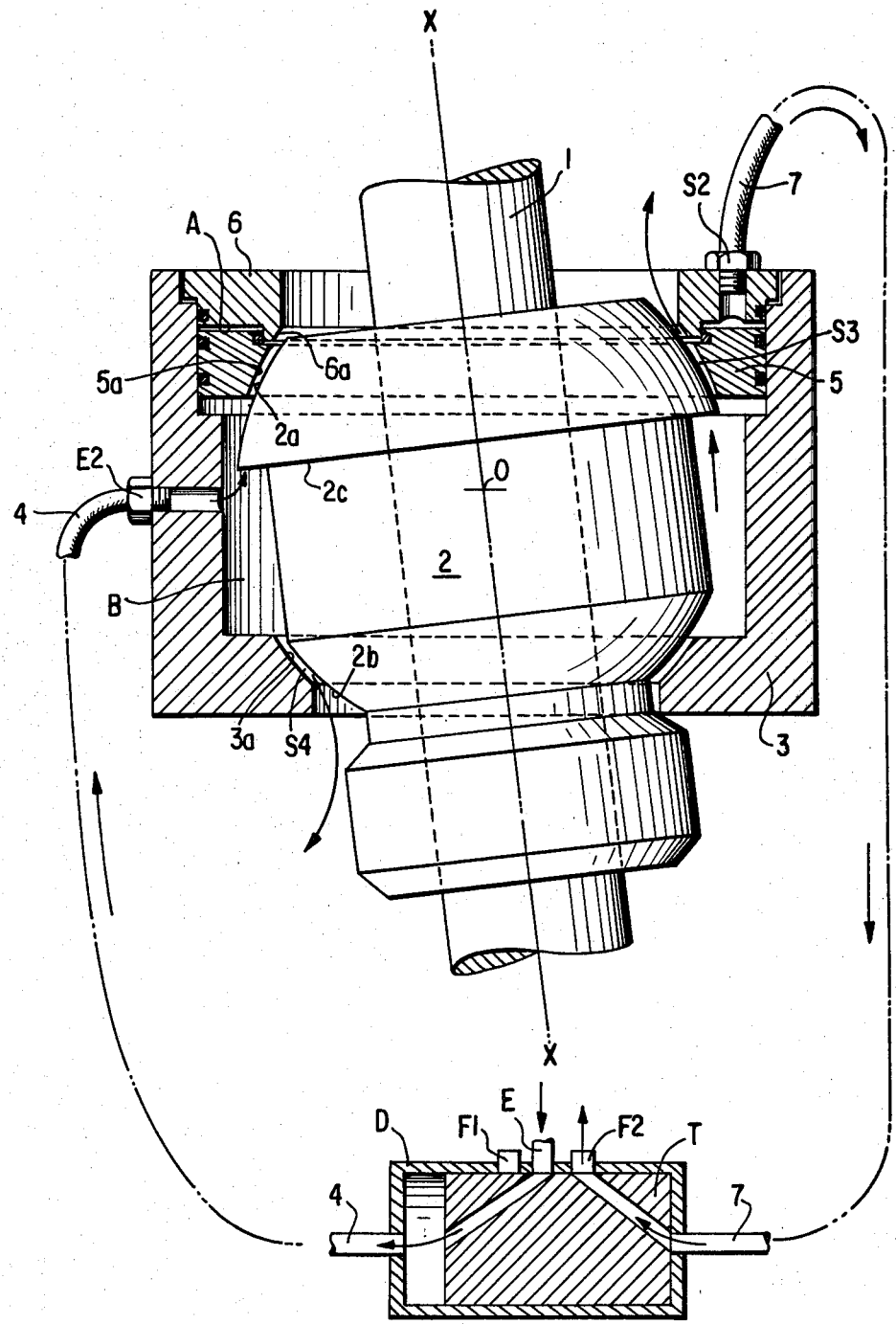
FIG. 3 shows an adjustable rod guide in accordance with the invention during the time it floats between the two seats.

In this way the shell is relieved of any coersion (see FIG. 3). The air introduced into the pipe line 4 escapes through escape channels S3 and S4 formed between the spherical portions 2a and 2b and the seats 5a and 3a respectively due to the fact that the shell is supported by a cushion formed by the air floating inside the housing 3. The shell then aligns its axis X—X with the axis of the guide GS without any effort. It is sufficient to expose the pipe line 4 to the open air and to admit again the air under pressure through the pipe line 7 in order to lock the shell without any perturbing jerking.

Reversal of the direction of displacement of the air can be achieved by means of a conventional slide distributor D. The air can be supplied from a balloon under pressure through a pipe line E. Two outlets F1, F2 alternately provide air from the open.

In FIG. 2 the pipe line 7 is supplied from E and the pipe line 4 is connected to the open air. The arrangement is reversed in FIG. 3.

The claims defining the invention are as follows:

1. An adjustable guide for a tool holder for use in high precision machining comprising:

a housing;

a guide seat located within said housing and having an internal surface;

a guide element positioned within said housing and having an internal surface, said guide element being movable with respect to said housing;

a casing disposed in said housing and positioned between said guide seat and guide element, said casing having a center portion and first and second end portions having outer surfaces shaped to mate with the internal surfaces of said guide seat and guide element respectively;

actuating means for engaging the internal surface of said guide element with the second end portion of said casing; and means for delivering fluid to said housing, said casing having a lifting means contacted by said fluid, said fluid supporting said casing when the internal surface of said guide element is out of engagement with the second end portion of said casing to permit displacement of said casing to a predetermined position.

2. The adjustable guide of claim 1 wherein said guide seat is fixed with respect to said housing.

3. The adjustable guide of claim 1 or 2 wherein said actuating means comprises an end member having an aperture for receiving fluid and a chamber defined by said end member, said housing and said guide element, fluid being delivered through said aperture to said chamber to move said guide element.

4. The adjustable guide of claim 1 wherein said internal surfaces of said guide seat and said guide element are concave, and the mating outer surfaces of the first and second ends of said casing are convex.

5. The adjustable guide of claim 1 wherein said lifting means comprises a lifting surface defined by the junction of said central portion and one of said end portions whereby fluid in the housing acts upon said lifting surface to assist in moving said casing.

6. An adjustable guide for a tool holder for use in high precision machining comprising:

a housing;

a guide seat located within said housing and fixed relative to said housing, said guide seat having a concave internal surface;

a guide element positioned within said housing, said guide element being movable with respect to said housing and having a concave internal surface;

a spherical casing disposed in said housing and positioned between said guide seat and said guide element, said casing having a center portion, first and second end portions having convex outer surfaces shaped to mate with said internal surfaces of said guide seat and said guide element respectively, said spherical casing further being a lifting surface defined by the junction of the central portion and one of the end portions of said casing;

actuating means for engaging the internal surface of said guide element with the second end portion of said casing;

means for delivering fluid to said housing, said fluid acting on said lifting surface and supporting said casing when the internal surface of said guide element is out of engagement with the second end portion of said casing to permit displacement of said casing to a predetermined position.

* * * * *